United States Patent

[11] 3,573,864

| [72] | Inventors | Samuel I. Caldwell<br>Brinfield;<br>Robert C. Greer, Pekin; Russell E. Sherer, Peoria, Ill. |
|---|---|---|
| [21] | Appl. No. | 773,915 |
| [22] | Filed | Nov. 6, 1968 |
| [45] | Patented | Apr. 6, 1971 |
| [73] | Assignee | Caterpillar Tractor Co.<br>Peoria, Ill. |

[54] APPARATUS FOR MAKING MACHINE TOOL TEMPLATES
5 Claims, 2 Drawing Figs.

[52] U.S. Cl.................................................. 249/165,
249/160, 18/42R, 264/316
[51] Int. Cl...................................................... B41b 11/60
[50] Field of Search........................................... 249/165,
166, 167, 163, 160; 18/42 (MR); 264/259, 316

[56] References Cited
UNITED STATES PATENTS
| 1,601,389 | 9/1926 | Gent............................ | 249/165X |
| 2,708,773 | 5/1955 | Bacon......................... | 264/316X |

Primary Examiner—J. Spencer Overholser
Assistant Examiner—DeWalden W. Jones
Attorney—Fryer, Tjensvold, Feix, Phillips & Lempio ABSTRACT: A method and apparatus for forming machine tool templates of plastic or ceramic materials by pouring such material, in a liquid state, into a compartment partially formed by a thin strip of sheet metal positioned by dowels which are prepositioned in the bed of the mold. As the poured material solidifies, that portion adjacent the thin strip of metal is molded into the shape of the desired template surface.

PATENTED APR 6 1971 3,573,864

INVENTORS
SAMUEL I. CALDWELL
ROBERT C. GREER
RUSSELL E. SHERER
BY
ATTORNEYS

APPARATUS FOR MAKING MACHINE TOOL TEMPLATES

SUMMARY OF THE INVENTION

This invention relates to a method of making low cost machine tool templates for reproducing irregular surfaces. More particularly, the invention relates to forming such surfaces by pouring a plastic material into a mold in which the desired template surface is formed by a piece of sheet metal positioned by dowels imbedded in the mold.

Tracer lathes employ a stylus which follows a template and, by means of a tracer control, guides the cutting tool to shape a workpiece to a specific configuration as determined by the surface of the template. Of the templates presently available, many must be made in a high precision machine shop at a large cost. Other templates have been formed by a solidified plastic process involving relatively complicated molds which are expensive to manufacture.

It is therefore an object of the present invention to provide a method and apparatus for manufacturing inexpensive templates.

It is also an object of this invention to provide such a method and apparatus wherein a plastic, ceramic, or other formable material is poured into a mold having a readily formable edge for reproduction of the desired template surface.

It is a further object of this invention to provide such a method and apparatus which obviates the necessity of preparing machine tool templates by milling or grinding the stylus surface in a precision machine shop, using a set of computed coordinate dimensions for a very large number of intermediate points, and polishing the final surface.

It is a still further object of the invention to provide an economical and accurate production template which may be reused as often as necessary.

It is also an object of this invention to provide a template mold capable of producing multiple patterns.

Other objects and advantages of the present invention will become apparent from the following description and claims as illustrated in the accompanying drawing which, by way of illustration, shows a preferred embodiment of the present invention and the principles thereof and what is now considered to be the best mode contemplated for applying those principles. It is recognized that other embodiments of the invention utilizing the same or equivalent principles may be used, and structural changes may be made as desired by those skilled in the art, without departing from the present invention and purview of the appended claims.

DESCRIPTION OF THE PREFERRED EMBODIMENT

Figure 1:
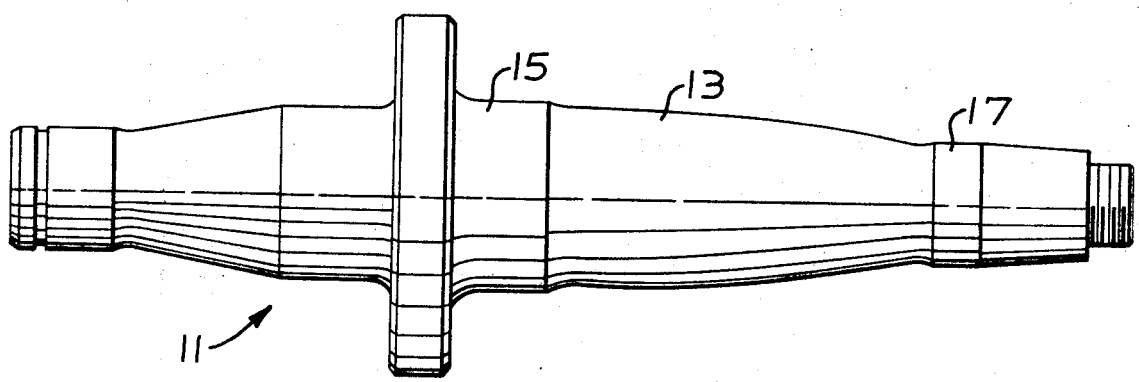
FIG. 1 shows a side elevational view of a workpiece formed by use of a template manufactured by means of the instant invention.

Referring now to the drawing in greater detail, there is shown in FIG. 1 a view of a sprocket shaft 11 having a parabolic curved surface 13 disposed between large and small diameter surfaces 15 and 17, respectively. The contour of surface 13 illustrates an example of a type of contour which is becoming more common in such shafts. The shafts are required to be so shaped so as to more effectively resist higher applied loads without substantially increasing the volume and weight of the materials.

A preferred method of turning irregularly curved contours such as surface 13 utilizes a tracer lathe employing a stylus following a template, whereby an electromechanical tracer control guides the cutting tool to reproduce a configuration on the workpiece, as dictated by the template.

Figure 2:
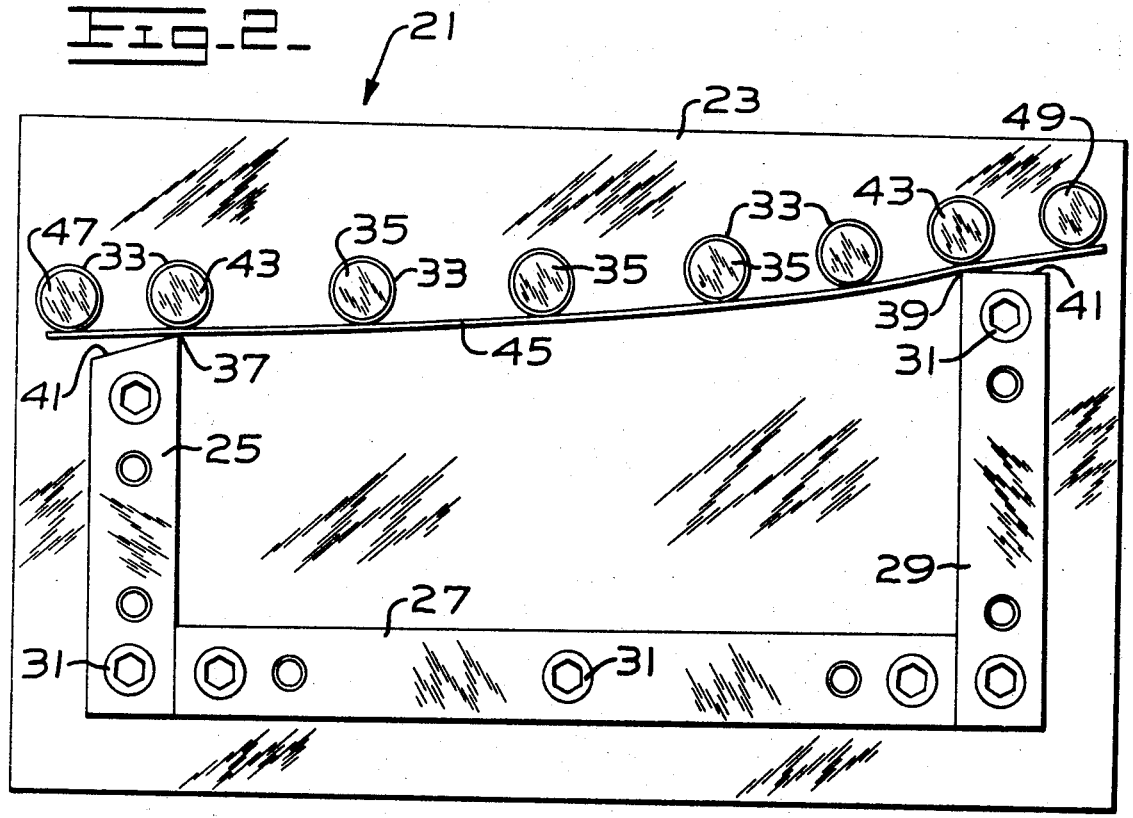
FIG. 2 is a plan view of the mold of the instant invention.

In FIG. 2 there is shown a mold 21 which may be utilized to satisfactorily produce such contours at relatively low cost. In general, the mold comprises a base member 23 to which wall members such as 25, 27, and 29 are suitably fastened by means such as bolts 31.

A series of holes 33 is bored into the base 23 at locations computed so as to place the point of tangency of each hole at the outer edge of a piece of metal strip which is to form the template surface.

Dowels 35 are inserted within each of the holes 33, intermediate the points 37 and 39 on the walls 25 and 29 of the mold. As can be seen in the drawing, the leading edges of the walls 25 and 29 have been recessed as at 41. Dowels 43 are positioned in holes 33 opposite the point 37 and 39 so as to firmly hold a thin strip material 45 against the points 37 and 39. Dowels 47 and 49 are then inserted in the end holes 33 which have been positioned so as to insure that they exert a biasing force on the strip 45, which force holds the strip against the dowels 35. Strip 45 may, of course, be of any thin deformable material such as metal, plastic, etc.

When the ceramic or plastic material, which may be comprised of any commercially available die casting material, is poured into the mold, it exerts additional pressure against the strip 45 to produce a smooth continuous curve with an accurate profile. When the material hardens, the strip 45 and the various dowels may be removed and the resultant product, taken from the mold, will serve as a template in a well-known manner.

Thus the applicants have provided an improved method and apparatus for manufacturing templates which is capable of economically producing such templates and which, while illustrated and described as a single preferred embodiment of the invention, are capable of variation and modification within the purview of the following claims. For example, the die material may be any desired material which will solidify after being poured into the mold; more than one side of the material may be so shaped by the use of a plurality of the described or similar means. Other modifications and variations are thus readily obvious to those skilled in the art.

We claim:

1. In an apparatus for manufacturing machine tool templates, a base member, a plurality of edge forming members defining leading edges fixed on said base to partially enclose an area on said base, said members defining by said edges an open side, a plurality of apertures in said base member along said open side and situated so as to be tangent to a first line which is parallel to a line defining a desired template surface, a thin strip of material on said base member having a thickness extending from said template surface line to said first line, said strip extending between said edges so as to close said open side, means in said apertures for holding said strip in place whereby formable material may be confined in the area defined by said strip and said plurality of edge forming members, said leading edges being recessed so as to define points contacting said strip and wherein one of said holding means is positioned opposite each point of contact so as to firmly hold said strip against a respective point.

2. The invention of claim 1 wherein said means in said apertures comprise dowels.

3. The invention of claim 1 wherein said plurality of edge forming members comprise a plurality of elongated walls arranged to partially enclose an area on said base.

4. The invention of claim 1 wherein the material of said strip comprises metal.

5. The invention of claim 1 wherein the material of said strip comprises plastic.